United States Patent
Furlong et al.

(10) Patent No.: US 7,802,094 B2
(45) Date of Patent: Sep. 21, 2010

(54) REDUCTION OF FALSE POSITIVE DETECTION OF SIGNATURE MATCHES IN INTRUSION DETECTION SYSTEMS

(75) Inventors: Peter Furlong, Dublin (IE); Andrew Davy, Harpenden (GB); Gareth Edward Allwright, St. Albans (GB); Jerome Nolan, Dublin (IE)

(73) Assignee: Hewlett-Packard Company, Ft. Collins, CO (US)

( * ) Notice: Subject to any disclaimer, the term of this patent is extended or adjusted under 35 U.S.C. 154(b) by 1139 days.

(21) Appl. No.: 11/064,225

(22) Filed: Feb. 22, 2005

(65) Prior Publication Data
US 2006/0174107 A1 Aug. 3, 2006

(30) Foreign Application Priority Data
Jan. 21, 2005 (GB) .................. 0501285.1

(51) Int. Cl.
*H04L 9/00* (2006.01)
(52) U.S. Cl. .................. 713/160; 713/188; 726/14; 726/22; 726/23; 726/24
(58) Field of Classification Search .................. 726/22; 713/160
See application file for complete search history.

(56) References Cited

U.S. PATENT DOCUMENTS

| | | | |
|---|---|---|---|
| 5,426,694 A | 6/1995 | Hebert | |
| 5,784,298 A * | 7/1998 | Hershey et al. | 714/39 |
| 6,023,456 A | 2/2000 | Chapman et al. | |
| 6,526,066 B1 | 2/2003 | Weaver | |
| 7,260,558 B1 * | 8/2007 | Cheng et al. | 706/12 |
| 7,548,848 B1 * | 6/2009 | Deb et al. | 704/9 |
| 2003/0065800 A1 * | 4/2003 | Wyschogrod et al. | 709/230 |
| 2003/0085533 A1 * | 5/2003 | Spiegl et al. | 277/650 |
| 2003/0110208 A1 * | 6/2003 | Wyschogrod et al. | 709/202 |
| 2003/0115344 A1 * | 6/2003 | Tang et al. | 709/229 |
| 2004/0025044 A1 * | 2/2004 | Day | 713/200 |
| 2004/0098617 A1 * | 5/2004 | Sekar | 713/201 |
| 2004/0202190 A1 * | 10/2004 | Ricciulli | 370/410 |
| 2006/0156404 A1 * | 7/2006 | Day | 726/23 |
| 2006/0167915 A1 * | 7/2006 | Furlong et al. | 707/101 |
| 2006/0174107 A1 * | 8/2006 | Furlong et al. | 713/160 |
| 2006/0195904 A1 * | 8/2006 | Williams | 726/24 |
| 2006/0227787 A1 * | 10/2006 | Furlong et al. | 370/394 |
| 2006/0242703 A1 * | 10/2006 | Abeni | 726/23 |

FOREIGN PATENT DOCUMENTS

| | | |
|---|---|---|
| GB | 2422507 | 7/2006 |
| WO | 99/59303 | 11/1999 |

* cited by examiner

*Primary Examiner*—Kambiz Zand
*Assistant Examiner*—Yonas Bayou

(57) ABSTRACT

Detection of a signature in a data packet comprises performing a pre-classification of the packet, using header information and particularly a 5-tuple access control list, into one of a multiplicity of flows and directing the payload of the packet to a respective one of a multiplicity of deterministic finite state machines each of which stores a plurality of signatures as a sequence of states and acts only on the respective flow.

11 Claims, 3 Drawing Sheets

REDUCTION OF FALSE POSITIVE DETECTION OF SIGNATURE MATCHES IN INTRUSION DETECTION SYSTEMS

FIELD OF THE INVENTION

This invention relates to packet-switched communication systems and particularly to intrusion detection systems incorporating DFAs (deterministic finite automata, i.e. state machines) particularly although not exclusively in network switches for use in networks conforming to IP (Internet Protocol).

BACKGROUND OF THE INVENTION

Network switches and other network units preferably include systems for detecting undesirable groups of characters, hereinafter termed 'signatures' which may occur in packets received by the switch or other unit. It is known to establish and maintain a 'signature database' i.e. a listing of all the known signatures which may represent a threat to the unit or network. Such a database is used in conjunction with a compiler to define a DFA which is used to detect the signatures. More particularly, a DFA is a state machine which comprises a multiplicity of different states and possible transitions between states. A signature is represented in the DFA by a particular sequence of states. For each state there is a determination whether a currently received character (e.g. a character currently read from an input FIFO) allows a transition to another state; if the input character does not allow a transition to a non-default state the state machine reverts to a default state. One example of a state machine of this character is described hereinafter.

A substantial benefit of employing a DFA for the detection of signatures is that a very large number of long signatures can be efficiently stored as a state machine and the machine at any time needs only to examine a current character to determine the next state of the machine.

However, a known phenomenon in pattern matching of signatures is that of 'false positives'. For example a signature which represents a threat in packet conforming to UDP (User Datagram Protocol) does not necessarily represent a threat in traffic which does not conform to UDP; such traffic may be packets that conform instead to TCP (Transport Control Protocol) or other protocols such as ICMP (Internet Control Message Protocol). Current methods that use a single DFA for all the signatures do not take into account the flow-type or other parameters and so return many false positives. All alerts raised have to be further processed to eliminate those not associated with the traffic flow under scrutiny. The main problem associated with the generation of false positives is the burden it places on a final processing stage, such a post-processor in a network switch. The generation of false positive reduces the capacity of such a post-processor, which in general has to execute or cause the final forwarding process for every packet through the switch. Furthermore, if large numbers of false positives are generated, it is possible that, owing to processing rate limitations, real security threats may not be detected.

The technique described below provides a mechanism by which the number of false positives can be dramatically reduced.

SUMMARY OF THE INVENTION

The basis of the present invention is a pre-classification of received packets according to the transmission flow to which they conform. This may be done using a 5-tuple classifier, particularly of IP Source Address, IP Destination Address, TCP Source Port, TCP Destination Port and Protocol. The classifier defines a plurality of flows to one of which a packet will belong. The invention further provides a corresponding multiplicity of DFAs so that the payload of a packet will be directed to that DFA which corresponds to the respective flow.

The extent to which the flows are defined using network layer (layer 3) and application layer (layer 4) address and/or protocol information is a matter of choice. The more of the L3/L4 information that is used in the classification of the packet the more closely the relevant signatures can be related to the flow. The incidence of false positives reduces but the overall size of the memory required to store all the DFAs increases as the amount of the header which is used for the classification and DFA selection increases.

Other features and advantages of the invention will be apparent from the following description of a preferred embodiment with reference to the accompanying drawings.

DETAILED DESCRIPTION

Figure 1:
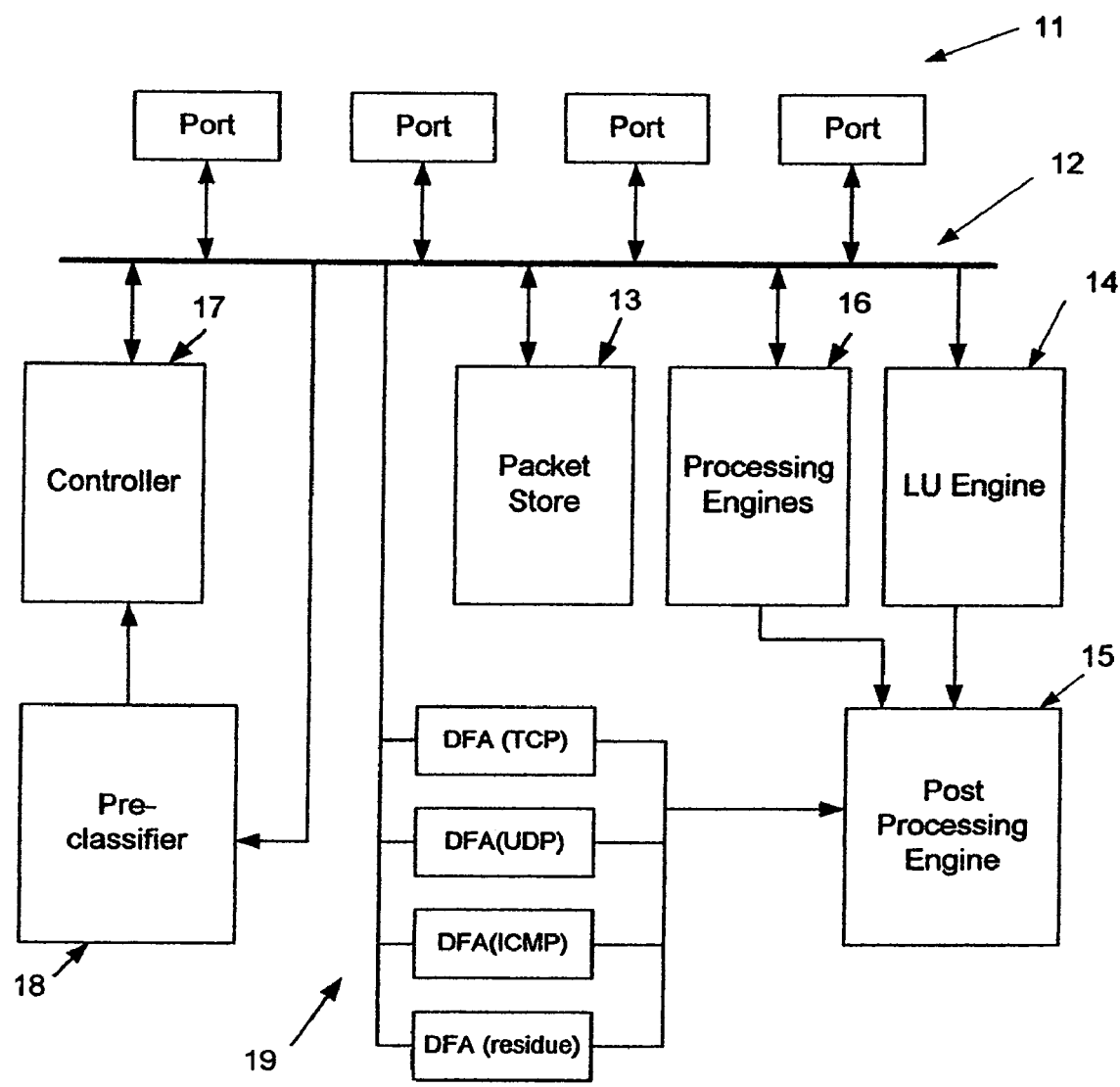
FIG. 1 is a schematic diagram of a switch incorporating the present invention.

FIG. 1 of the drawings illustrates schematically for the sake of example the principal elements of a network unit such as a switch incorporating the invention. It should be understood that there exists a wide variety of architectures for such network units and the invention is not intended to be limited to any particular variety of architecture. For the most part, a network unit as shown in FIG. 1 is or can be in commonplace form and therefore will be only briefly described.

The unit has a multiplicity of external ports 11 by which the unit can receive addressed data packets and from which addressed data packets can be forwarded. It includes an internal communication system, herein simply represented by a bus 12, by which packets, control signals and commands are conveyed across the unit. The unit includes a main packet store 13 which receives packets while they are processed before being forwarded, or in some cases, discarded. When a packet is received, address fields in its header are examined by a lookup engine 14 which determines, with the aid of a lookup or forwarding database (not shown) forwarding data for the packet. As is well known to those skilled in the art, forwarding data for the destination specified in the packet may not exist and therefore the unit may need to perform an address resolution protocol to obtain one. This and other customary features of a unit such as a switch or router will not be described.

The unit usually includes other processing engines 16 which in accordance with VLAN information, spanning tree information or otherwise may modify or supplement the forwarding data obtained by the lookup (LU) engine. The actions prescribed by the engines 14 and 16 are collated by a post-processor 15, which is a processing engine that will (in the absence of any other consideration) produce a final forwarding action based on the forwarding data and in particular produce a 'final' bit mask so that the packet can be sent from the port or ports determined by the forwarding action.

Eventually (for example depending on the state of transmit or output queues defined for each port) a packet is retrieved from the store 13 and passed to the port or ports (if any) specified in the final port bit mask.

The passage of packets or parts of packets across the switch and particularly to and from the store 13 is controlled by a controller 17.

As thus far described the network unit operates in accordance with known practice.

The switch incorporates a security block, which may be implemented as a specific ASIC (application specific integrated circuit) or otherwise. This security block comprises a pre-classifier 18 and a multiplicity of DFAs 19.

The pre-classifier 18 receives selected fields from the header of a packet, preferably simultaneously with the examination of the header data by the lookup engine and the other processing engines.

The pre-classifier 18, which has recourse to a database of access control lists (not shown), may comprise any suitable search engine, such as a trie search engine or a ternary CAM (content addressable memory). Suitable trie search engines are described for example in prior U.S. Pat. No. 6,804,230 issued Oct. 12, 2004 to Jennings et al and U.S. Pat. No. 6,764,348 issued Jul. 13, 2004 to O'Keeffe et al, both commonly assigned herewith. One example of ternary CAM organized to search on selected fields of a packet header is described in the prior co-pending application filed Jan. 24, 2005 by Allwright et al., entitled 'Trie search engines and ternary CAM used as pre-classifier' and commonly assigned herewith.

The pre-classifier may classify on the basis of a 5-tuple ACL (access control list). Such an ACL consists of a network source address (e.g. IP Source Address), a network destination address (e.g. IP Destination Address), an application source port (e.g. a TCP Source Port), an application destination port (e.g. a TCP Destination Port) and the relevant protocol. It is not necessary to employ all the fields in the list to provide a determination of the flow; as discussed above, the more narrowly the flow is defined the less the incidence of false positives for the flow.

The pre-classifier would define a selectable number of flows; in the example given there are three flows defined; for TCP packets, UDP packets and ICMP packets. In practice there would be a residue flow for packets that were not determined to be within any of the explicitly defined flows.

For each flow there is a DFA, a state machine which defines the signatures in terms of sequences of states and transitions between states.

Depending on the flow to which the packet is determined to belong by the pre-classifier 18, the controller 17 directs the payload of the respective packet to one or other of the DFAs 19. in the example, payloads of packets conforming to TCP are examined by the DFA(TCP), payloads of packets conforming to UDP are examined by the DFA(UDP) and payloads of packets conforming to ICMP are examined by the DFA(ICMP). Payloads of other packets are examined by the 'residue' DFA.

On the detection of a signature by any of the DFA state machines a signal is sent to the post-processor 15 which takes such action as may be prescribed. This action may be to direct the packet to a monitoring port for analysis; such action will require modification of the bit mask to specify only the relevant monitoring port. Alternatively the post-processor may be instructed to discard the packet.

Figure 2:
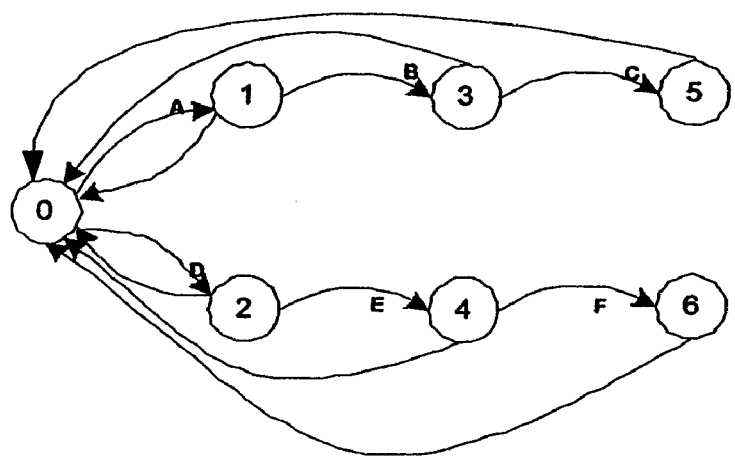
FIG. 2 is a state diagram of a DFA.

FIG. 2 is a simple example of a dual DFA which is organized to detect either of two signatures, represented by the character sequences ABC and DEF. In practice each character is an ASCII character. Commonly a signature may comprise up to several hundred characters and the DFA may store a large multiplicity of character sequences; for the sake of simplicity each sequence in the example consists of only three characters. In the example, '0' is the initial or 'default' state. If the first character is 'A', the state machine transitions to state '1'. If the next character is 'B', the machine transitions to state 3 and if the third character is 'C', the state machine transitions to state '3' and the signature ABC is detected. If the input character is not one which is required by the respective sequence, the state machine transitions to the default state. Thus if the machine is in state '3' and the next character is 'F', the machine transitions to the default state '0'. Likewise the character string DEF is detected if the state machine executes the sequence of states 0-2-4-6.

A state machine is established by means of a compiler which has regard to all the signatures that might represent threats; the operation of such a compiler is known in the art and is not directly relevant to the present invention.

Figure 3:
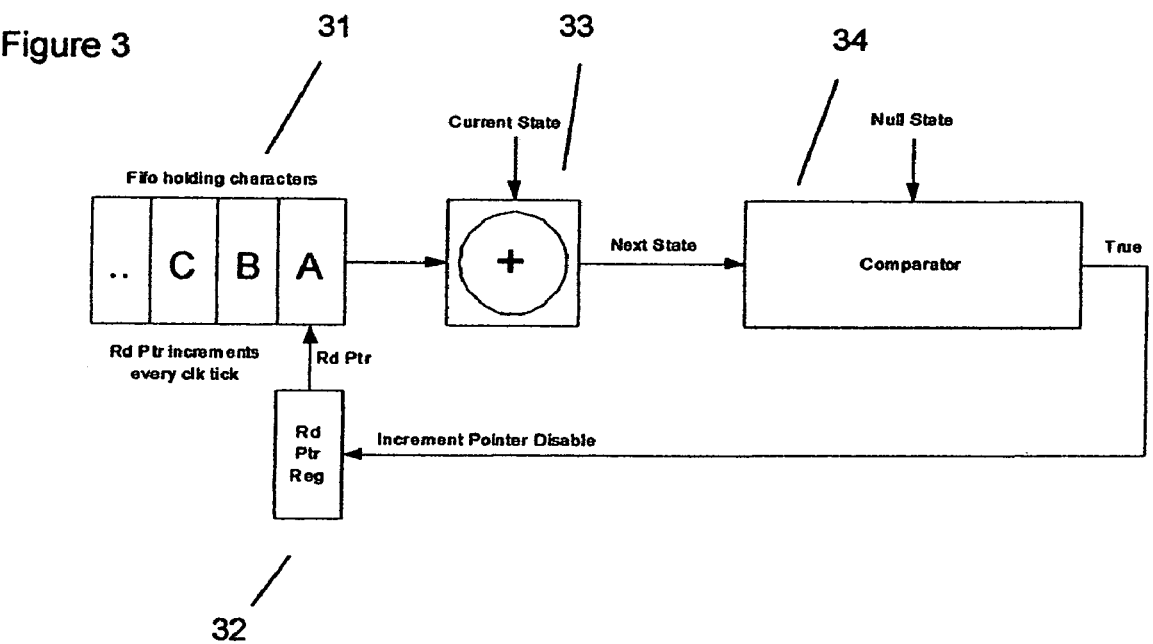
FIG. 3 is a schematic diagram of a DFA.

As shown in FIG. 3, a stream of input characters is stored in a sequentially retrievable manner, in particular in a FIFO 31. The reading of the characters is controlled by a read pointer, of which the value is held in a register 32. Normally the pointer is incremented in each cycle (i.e. every 'clock tick') to read the next character in the FIFO. In the example, the first three characters in the FIFO are A, B and C. In ordinary operation the read pointer would be incremented and the DFA table would be incremented. In other words, the relevant character is used in combination with the current state (as previously described) to determine the next state of the DFA, as shown at 33 in FIG. 3.

The present example requires suspension of the incrementing of the read pointer if the DFA transitions to the null state. If, as shown in FIG. 3, the state is not null, the default state 0, the FIFO read pointer is incremented normally. If the state is null, the read pointer is not incremented but the DFA is incremented.

To achieve this, the next state obtained by the DFA is compared in a comparator 34 with a value representing the null state. If there is a match, the comparator produces a one cycle inhibit, denoted 'increment pointer disable', which prevents the normal incrementing of the read pointer and thereby causes a re-reading of the current character.

The state machine described in FIGS. 2 and 3 is further described in co-pending application for Furlong et al, entitled 'Pattern matching using deterministic finite automata and organization of such automata' based on GB patent application No. 0501232.3 filed 21 Jan. 2005 and having a common assignee herewith.

As previously indicated each of the state machines (DFAS) in FIG. 1 may be constituted by a DFA as described with reference to FIGS. 2 and 3. Each may be compiled using a common compiler. However, the traffic they examine has been pre-classified, the residue being examined by the DFA (residue)

Figure 4:
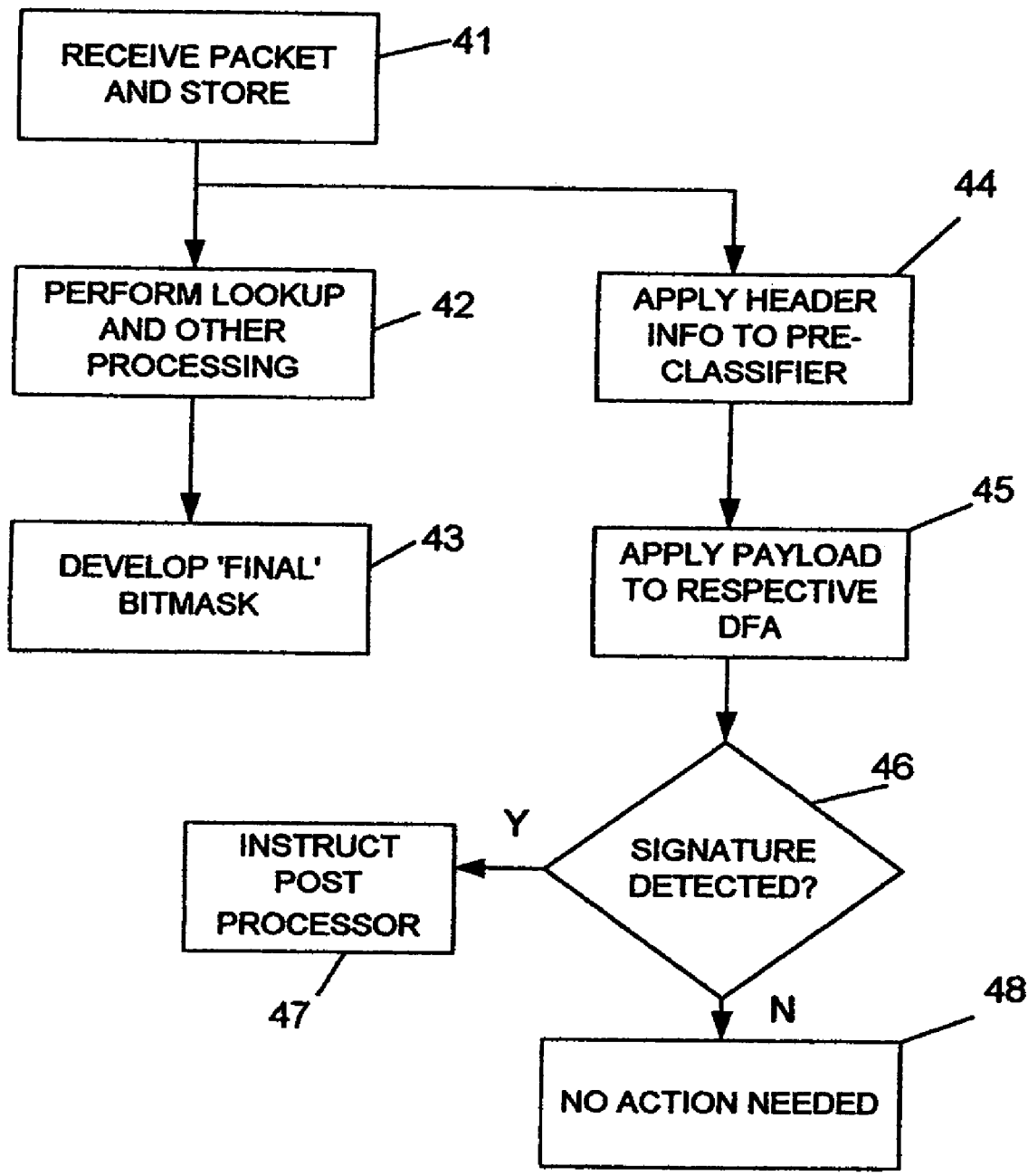
FIG. 4 is a flow diagram of the method of the invention.

FIG. 4 illustrates the method of the invention. Stage 41 indicates the reception of a packet and its storage. Stage 42 indicates the ordinary lookup and other processing which develops a 'final' bit mask (stage 43). Stage 44 indicates the application of the header information to the pre-classifier; stage 45 indicates the application of the payload to the respective DFA. Decision 46 represents the action of the respective DFA. If no signature stored in the DFA is found, no action is required (stage 48) and the packet may proceed normally. If a signature is found, then a relevant instruction (as discussed above) is sent to the post-processor (stage 47).

In the described system therefore, the detection of a signature which is significant only to a packet conforming to UDP will not give a false positive if the packet is a TCP packet or an ICMP packet. The scheme greatly reduces the incidence of false positives.

What is claimed is:

1. A method for the detection of a signature in a data packet comprising a header and a payload, comprising:
   defining a multiplicity of flows in a pre-classifier, each defined flow corresponding to one of a multiplicity of deterministic finite state machines, each corresponding deterministic finite state machine storing, as a sequence of states, a plurality of signatures representing threats in the corresponding defined flow;
   applying selected fields of the header of the packet to the pre-classifier to determine to which of the multiplicity of defined flows said packet belongs wherein the pre-classifier defines a flow from a 5-tuple access control list; and
   applying the payload of said packet to the corresponding one of the multiplicity of deterministic finite state machines.

2. A method as in claim 1 wherein said access control list comprises a network source address, a network destination address, an application source port, an application destination port and a protocol.

3. A method as in claim 1 wherein said defining a multiplicity of flows comprises defining separate flows of TCP packets and UDP packets.

4. A network unit organized for the detection of signatures in received packets, comprising:
   a store for received data packets; a pre-classifier for the classification of a received packet into one of a multiplicity of defined flows wherein the pre-classifier defines a flow from a 5-tuple access control list;
   a multiplicity of deterministic finite state machines, each corresponding to a different one of the defined flows and each of which stores, as a sequence of states, a plurality of signatures representing threats in the corresponding defined flow; and
   a controller which directs a payload of said received packet from said store to a respective one of said multiplicity of deterministic finite state machines according to the corresponding defined flow as determined by said pre-classifier.

5. A network unit as in claim 4 and further comprising a residue deterministic finite state machine for the examination of packets which are outside any of said flows.

6. A network unit organized for the detection of signatures in received packets, comprising:
   a store for received data packets;
   processing engines including a post-processor for the development of a final forwarding bit mask for a received packet;
   a pre-classifier for the classification of a received packet into one of a multiplicity of defined flows wherein the pre-classifier defines a flow from a 5-tuple access control list;
   a multiplicity of deterministic finite state machines, each corresponding to a different one of the defined flows and each of which stores, as a sequence of states, a plurality of signatures representing threats in the corresponding defined flow; and
   a controller which directs a payload of said received packet from said store to a respective one of said multiplicity of deterministic finite state machines according to the flow as determined by said pre-classifier; wherein each of the multiplicity of deterministic finite state machines is coupled to the post-processor to provide an instruction thereto in the event of detection of a signature match.

7. A network unit as in claim 6 and further comprising a residue deterministic finite state machine for the examination of packets which are outside any of said flows.

8. A network unit as in claim 6 wherein said multiplicity of deterministic finite state machines comprises a respective deterministic finite state machine for each of at least a TCP flow and a UDP flow.

9. A network unit as in claim 6 wherein said multiplicity of deterministic finite state machines comprises a respective deterministic finite state machine for each of at least a TCP flow, a UDP flow and an ICMP flow.

10. A network unit as in claim 4 wherein said access control list comprises a network source address, a network destination address, an application source port, an application destination port and a protocol.

11. A network unit as in claim 6 wherein said access control list comprises a network source address, a network destination address, an application source port, an application destination port and a protocol.

* * * * *